United States Patent [19]

Ticker et al.

[11] 4,303,608
[45] Dec. 1, 1981

[54] APPARATUS AND METHOD FOR MOLDING OF SUBMERGED SURFACES

[76] Inventors: Arthur Ticker, 12117 Maddox La., Bowie, Md. 20715; Herman S. Preiser, 2 Revell Rd.; William Klemens, 441 Bendale Rd., both of Severna Park, Md. 21146; John L. Drake, Jr., 807 Windsor Rd., Arnold, Md. 21012

[21] Appl. No.: 114,454

[22] Filed: Jan. 23, 1980

[51] Int. Cl.³ .......................... B29F 1/06; G01B 5/28
[52] U.S. Cl. ..................... 264/40.1; 73/105; 264/101; 264/225; 425/175; 425/178
[58] Field of Search .............. 264/225, 40.1, 319, 264/101; 73/104, 105, 86, 152, 40; 425/175, 178

[56] References Cited

U.S. PATENT DOCUMENTS

| | | | |
|---|---|---|---|
| 2,601,703 | 7/1952 | Sawyer | 264/40.1 |
| 2,618,014 | 11/1952 | Sawyer et al. | 73/104 X |
| 2,618,965 | 11/1952 | Gray | 73/105 X |
| 3,043,129 | 7/1962 | King | 73/40 |
| 3,505,861 | 4/1970 | Schoefer et al. | 73/105 |
| 3,966,871 | 6/1976 | Schröder | 264/40.1 X |
| 3,978,716 | 9/1976 | Kirschke | 73/86 |
| 3,995,483 | 12/1976 | Hartong et al. | 73/104 |
| 4,047,863 | 9/1977 | McCluskey et al. | 425/13 |
| 4,104,906 | 8/1978 | Oertle | 73/104 |
| 4,198,362 | 4/1980 | Ticker et al. | 264/319 X |

FOREIGN PATENT DOCUMENTS

675754 1/1966 France ........................ 73/105

*Primary Examiner*—Philip Anderson
*Attorney, Agent, or Firm*—R. S. Sciascia; L. A. Marsh; W. W. Randolph

[57] ABSTRACT

A method and apparatus for replicating the submerged surfaces of ships and other marine structures. One apparatus includes a housing which is partitioned into forward and rear chambers by a membrane and a piston member, which is carried by the membrane. Upon selective flooding of the rear chamber and evacuation of the forward chamber, the piston member is moved toward the submerged surface to form an evacuated molding region therebetween. Liquid molding material is then drawn into the evacuated molding region and the molding device is retained in position until the material solidifies.

An alternative molding apparatus includes a housing with peripheral suction elements for releasably securing the housing to the submerged surface so that a molding region is defined therebetween. Upon displacement of water from and subsequent evacuation of the molding region, settable molding material is introduced into the molding region.

12 Claims, 8 Drawing Figures

APPARATUS AND METHOD FOR MOLDING OF SUBMERGED SURFACES

The invention described herein may be manufactured and used by or for the Government of the United States of America for governmental purposes without the payment of any royalties thereon or therefor.

BACKGROUND OF THE INVENTION

This invention relates to a method and apparatus for measuring surface roughness and more particularly to a means for replicating the surfaces of ships in an underwater environment.

The role of hull surface roughness in retarding the effective performance of highspeed ships by increasing the frictional drag, and consequently, the operational power requirements is well known. One cause of a gross type of surface roughness is biological fouling of the hull surfaces by calcerous organisms and various algae. Normally, the effects of the highly active biological fouling environment are minimized by use of antifouling paints and periodic cleaning of the hull. Other causes of a gross type of surface roughness include material defects, fabrication errors and poor workmanship which can be substantially minimized by careful manufacturing and fabrication techniques. However, irrespective of the fabrication techniques and biological cleaning procedures, a significant amount of microsurface roughness is inherently present on the painted hull surfaces of ships. This micro or residual roughness, which substantially contributes to frictional drag, is related to the texture characteristics of the paint or coating; the surface preparation and application techniques; erosion, corrosion and pitting of the coating; mechanical damage due to abrasion of the coating; and biological and chemical changes in the coated surface. Since this micro roughness exerts considerable influence on such operational parameters as speed capability, fuel consumption and noise generation, the development and utilization of procedures to determine such micro roughness is especially desirable.

A particular example of a proposed molding apparatus for replicating the minute surface characteristics of the surface of a hull is disclosed in U.S. Pat. application Ser. No. 947,390 filed Oct. 2, 1978, by A. Ticker and H. Preiser. The Ticker molding apparatus generally comprises a cup-shaped housing having an interior chamber partitioned by a diaphragm into a closed-off rear subchamber and a forward subchamber which forms a replicating chamber when the housing is positioned against and secured to the hull surface. A piston member containing a wax molding material is connected to the diaphragm so that upon selective evacuation of the forward subchamber and flooding of the rear subchamber the membrane and piston member are forced toward the hull surface until the molding material is in contact with the hull surface. Thereafter, a resistive heating element, which is connected to the wax molding material, is actuated so that the wax material softens and conforms to the surface of the hull. Upon hardening of the wax material, which may include thermosetting substances, water is admitted to the forward subchamber to force the membrane and the piston member away from the hull so that the wax impression is separated therefrom.

However, molding apparatus employing wax molding materials have an inherent drawback of requiring heating means for supplying a proper amount of heat to soften the wax material without unduly melting the replicating portions of the wax material. Also, since the surfaces to be replicated essentially behave as large heat sinks, it may be especially difficult to maintain portions of the wax material in the appropriate state. Other problems experienced with wax replicating techniques are that air pockets may become trapped between the wax material and the replicated surface and that the wax mold is often difficult to remove intact.

SUMMARY OF THE INVENTION

This invention overcomes many problems encountered with the prior art and provides an improved method and apparatus for replicating and reproducing minute details of the submerged surfaces of ships and other marine structures. A preferred form of apparatus includes a housing which is partitioned into a forward molding chamber and a rear chamber by a member including a membrane. Attached to the membrane is a gasketed molding piston which is designed to be pressed against the hull of the ship to form the molding chamber upon selective flooding of the rear chamber and evacuation of the forward molding chamber. Liquid molding material is drawn by the vacuum applied to the forward molding chamber into a molding region defined by the gasketed surface of the piston and the ship surface whereupon the molding device is retained in position until the molding material solidifies. Thereafter, the housing is removed from the surface of the ship by flooding the forward molding chamber of the housing.

An alternative molding apparatus includes a housing having peripheral suction elements for releasably securing the housing to the submerged surface so that a molding region is defined therebetween. The molding apparatus is positioned on the hull surface so that water is displaced from an outlet in the lower portion of the molding region when compressed air is introduced into the molding region. Subsequently, a vacuum is applied to the molding region and molding material is introduced into the evacuated molding region.

Accordingly, a general object of the present invention is to provide a molding apparatus which is relatively simple in structure, durable and reliable throughout a long useful life, and which effects substantial savings in manufacture, operating costs and maintenance.

Another object of this invention is the provision of a method for making a mold of a submerged surface wherein the mold is extremely uniform in detail, and extremely stable as to size and shape upon removal thereof from the mold cavity.

A further object of the present invention is to provide a compact, lightweight molding apparatus which is essentially self-contained for application in an underwater environment.

Yet another object of this invention is the provision of a method for producing molds in which the molding procedure is extremely rapid and economical to practice.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may be best understood by reference to the following description taken in connection with the accompanying drawings, in which:

DESCRIPTION OF THE PREFERRED EMBODIMENTS

Figure 1:
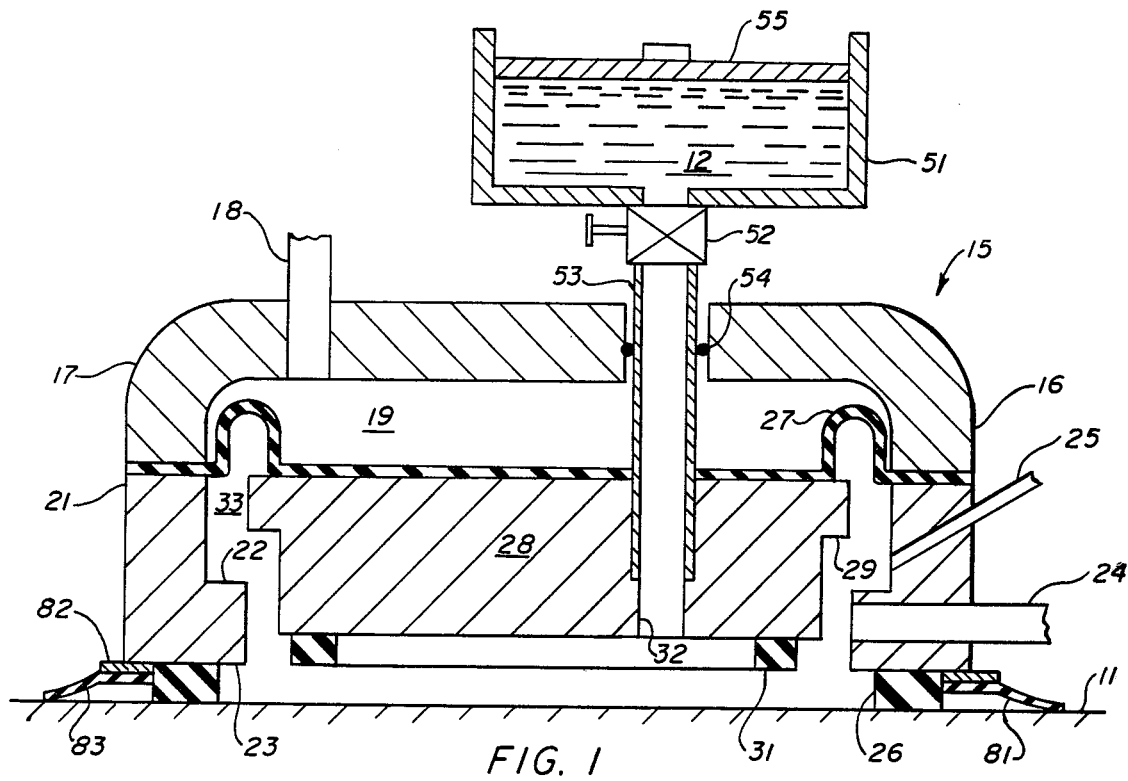
FIG. 1 is a schematic view of the molding apparatus in section, in its initial position on the hull of the ship.
Figure 2:
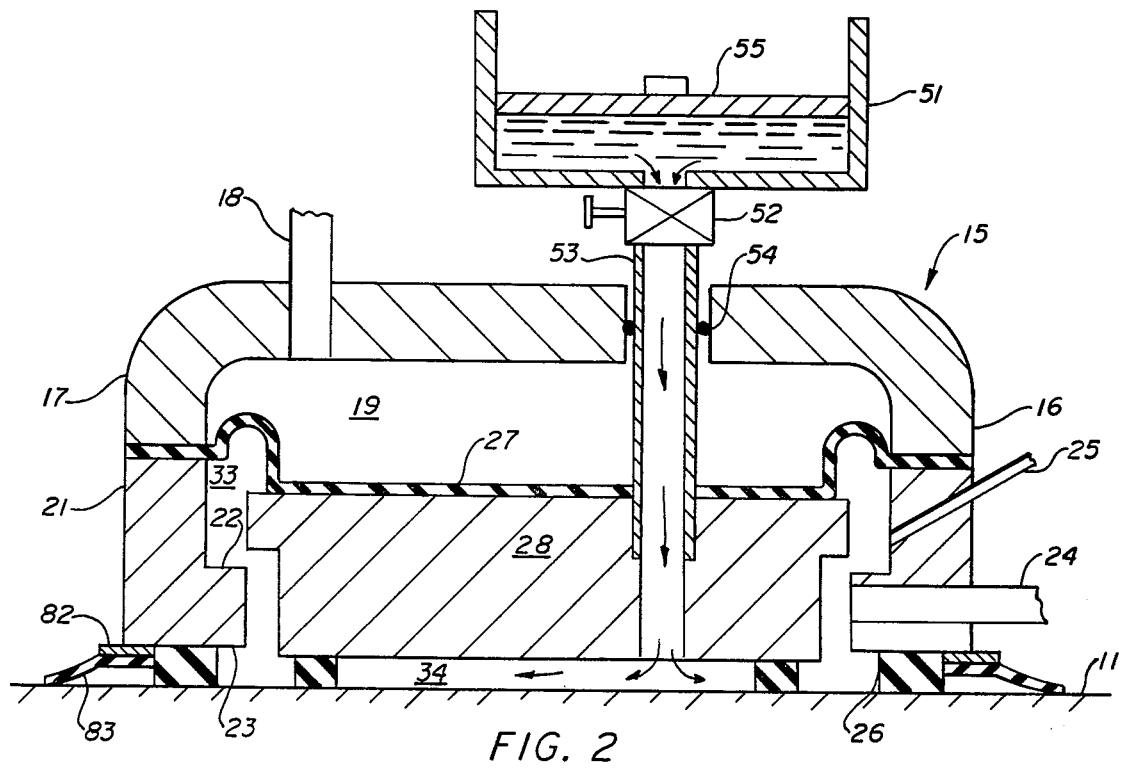
FIG. 2 is a view similar to FIG. 1, showing the molding piston in position against the hull of a ship wherein a molding region is defined therebetween.

Referring now more particularly to the drawings, and specifically to FIGS. 1 and 2 thereof, there is shown a molding apparatus 15 for copying and replicating the minute details of submerged surfaces of ships and other marine structures. The molding apparatus 15 includes a housing 16 having respective upper and lower parts 17, 21 with a flexible membrane 27 positioned therebetween. The membrane 27 serves to separate the housing 16 into a rear chamber 19 and a forward chamber 33. Attached to and carried by the membrane 27 is a piston member 28 which is designed to move in sliding relationship with the housing 16 upon the variation of the pressure differential between the forward 33 and rear 19 chambers. To preclude the piston member 28 from passing through the opening in the lower part of the housing 16, stop means in the form of a circumferential flange 22 on the lower part 21 of the housing 16 and an abutting flange 29 on the piston member 28 have been provided.

Along the exposed edge surfaces 23 of the lower part 21 of the housing 16 is attached a resilient gasket 26 which, for example, may be of magnetic material or constructed to function like a suction cup to permit attachment of the device to the ship hull to provide a watertight seal therebetween. An additional peripheral seal element 81 in the form of stiff collar 82 with a pliant circumferential flange 83 depending therefrom may be positioned around the periphery of the housing 16 with the collar 82 in abutting relationship with the edge surface 23. Thus, upon compression of the housing gasket 26, the pliant flange 83 is likewise pressed against the surface of the hull 11 to form an effective, wide seal structure for the housing 16. The peripheral seal element 81, which functions like a suction cup, serves to facilitate the initial positioning and attachment of the molding device 15 to the hull surface 11. For example, for hull sections having curved surfaces, the pliant flange 83 is designed to readily conform to such surface variations. A resilient piston gasket 31 of similar construction as the housing gasket 26 is attached to the periphery of the molding piston surface to define a molding region 34 within the forward molding chamber 33.

Settable molding material 12 for the molding region 34 of the piston member 28 is provided by a molding cartridge 51, which is connected via a material injection valve 52 and an inlet tube 53 to the material injection port 32 for the molding region 34. The inlet tube 53 passes through an opening in the upper part 17 of the housing 16 and a seal element, such as an O-ring 54, is positioned therebetween to permit relative movement of the inlet tube 53 therethrough while maintaining an effective seal between the rear chamber 19 and the environment.

In a preferred embodiment, a disposable molding cartridge 51 is utilized to facilitate rapid deployment and injection of the molding material. For example, a molding cartridge 51 of the type exemplified by U.S. Pat. No. 3,144,966 and manufactured by Semco, Inc. and containing a premeasured charge of molding material 12 is designed to be inserted into a recessed hole of the injection valve 52. Such prepackaged cartridges normally contain a two or more component system in separate compartments which are premixed with a plunger rod or other mixing means just prior to installation of the cartridge onto the injection valve 52. Settable materials 12 such as RTV silicone rubber and urethanes may be used in the disposable cartridges.

Movement of the membrane 27 and piston member 28 as well as the flow of molding material 12 from the molding cartridge 51 to the molding region 34 is determined by variations in the pressure differential between the forward 33 and rear 19 chambers. This is generally accomplished by providing ports in the upper and lower parts of the housing which communicate with the respective chambers and are connected to suitable valving (not shown) to permit selective evacuation and flooding of the chambers. Such valving may, for example, comprise three way valves provided for each of the chambers and selectively positionable to alternatively open the chamber to the surrounding environment (air or water) or evacuate and close off the chamber from the environment. With particular reference to FIGS. 1 and 2, there is shown a first port 18 in the rear chamber 19 and a second port 24 in the forward chamber 33. These ports are connected to suitable valving so that the chambers may be flooded with water or evacuated by means of a vacuum source. An additional port 25 of smaller dimensions than the other ports 18, 24 is provided for the forward chamber 33 to allow air to be bled into the forward chamber 33. The purge port 25, which may have a restricted orifice on the order of about 5 microns, is connected to the air atmosphere via a conduit and is small enough so as not to draw an excessive amount of ambient air into the forward chamber 33 when a vacuum is applied thereto. Without the use of a purge port 25, evacuation of a water filled molding chamber would tend to cause retention of water, at a lowered pressure, in the chamber. The purge port 25 allows ambient air to be drawn into the forward chamber 33 so that the water is displaced and effectively removed from the forward chamber 33 through port 24.

In operation, the molding device 15 is prepared topside and the rear chamber 19 evacuated to retract the piston member 28 into the housing 16. Subsequently, the molding device 15 is lowered into the underwater environment and positioned against a section of the hull 11 which is to be replicated as shown in FIG. 1. The circumferential flange 83 of the peripheral seal element 81 acts like a suction cup to initially hold the molding device 15 against the hull surface 11, thereby freeing the operator's hands for other matters. By turning the appropriate valving, water is evacuated from the forward chamber 33 which causes the housing gasket 26 and the peripheral seal element 81 to be compressed against the hull surface 11, thereby tightly adhering the molding apparatus 15 to the hull surface 11. The vacuum pressure is maintained in the forward chamber 33 by a vacuum pump connected to the second port 24. For example, the vacuum level in the forward chamber 33 may be maintained within a range of 10 to 29 inches of mercury (Hg) and preferably between 20 and 29 inches of mercury. Further, the differential pressure across the membrane 27 varies with the working depth. For example, at sea level the differential pressure will be about 14 psi and at a working depth of twenty-seven feet the differential pressure will be about 28 psi. After the seawater has been withdrawn from the forward chamber 33, the first port 18 is placed in fluid communication with the seawater so that the rear chamber 19 is flooded, thereby forcing the piston member 28 toward the hull surface 11 and firmly compressing the piston gasket 31 thereagainst. As shown in FIG. 2, the molding cartridge 51 and inlet tube 53 are likewise drawn toward the hull surface 11. A molding region 34 for receiving the molding material 12 is formed within the region defined by the piston gasket 31, the exposed surface of the piston member 28 and the hull surface 11. When the injection valve 52 is opened, the hydrostatic pressure forces the molding material 12 through the inlet tube 53, the material injection port 32 and into the molding region 34 as shown by the arrows in FIG. 2. Although the pressure differential between the molding region 34 and the seawater environment will normally be adequate to advance the plunger 55 in the molding cartridge 51, other means such as a caulking gun type of plunger mechanism may be utilized when necessary to assist the vacuum pressure. The molding device 15 is maintained in position until the molding material 12 has adequately hardened. Then the molding device 15 may be removed from the hull surface 11 by releasing the vacuum and flooding the unfilled portion of the forward molding chamber 33 between the piston gasket 31 and the housing gasket 26.

Figure 4:
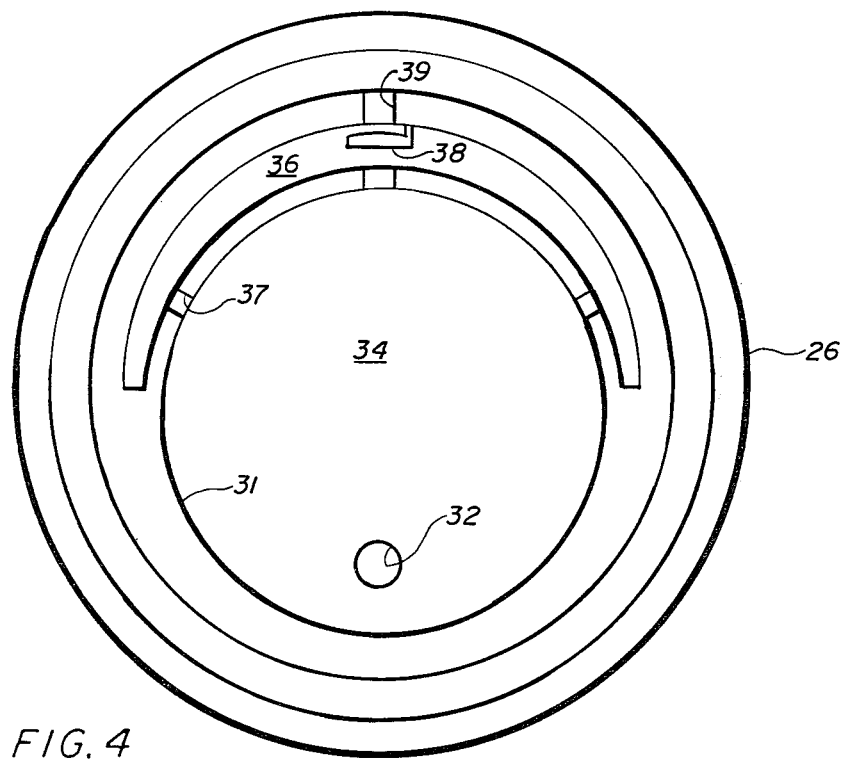
FIG. 4 is a simplified plan view of a molding chamber of the molding apparatus.

To permit the molding material 12 to completely fill the molding region 34, the molding device 15 is oriented so that the material injection port 32 is at the bottom of the molding region 34 and the overflow region for the molding material 12 is at the crown or apex of the molding region 34, as is depicted in the different embodiments shown in FIGS. 4–8. In FIG. 4, the piston gasket 31 is formed such that an overflow region 36 for the molding material 12 is provided at the top of the molding region 34. When the molding material 12 enters the molding region 34 it displaces the air therein until it eventually flows through passages 37 and fills up the overflow region 36. When the overflow region 36 becomes filled, the molding material 12 forces a lightweight flapper valve 38 against and closes the outlet opening 39, thereby curtailing the flow of molding material 12.

Figure 6:
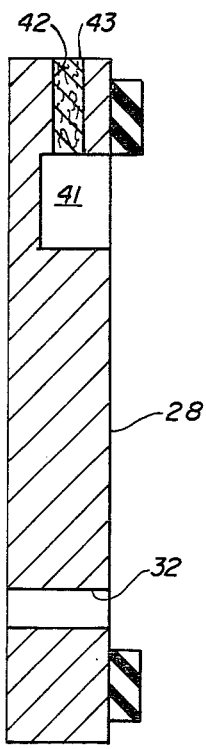
FIG. 6 is a sectional view of FIG. 5, taken generally along line 5—5.
Figure 5:
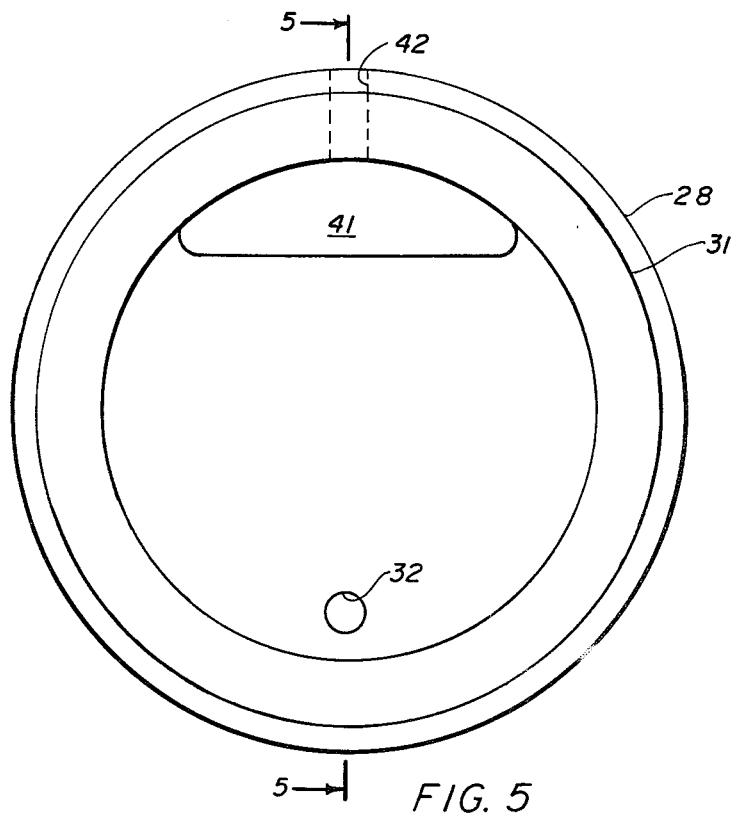
FIG. 5 is a plan view of the molding region of a second embodiment of the molding piston.

FIGS. 5 and 6 depict another variation of piston member 28 and corresponding molding region 34 wherein the overflow means for the molding material 12 comprises a recessed overflow chamber 41 with an outlet 42 passing through a sidewall of the piston member 28. Upon filling the molding region 34, the molding material 12 flows into the overflow chamber 41 and is effectively stopped by the filter plug 43. The filter plug 43, which may be formed of porous polyethylene having an effective filter pore size of 35 micron porosity, is designed to permit the free flow of air and water therethrough but preclude the flow of the molding material 12.

Figure 8:
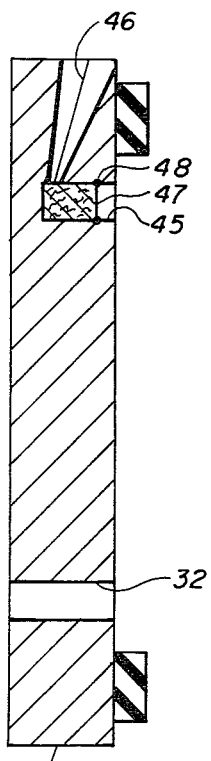
FIG. 8 is a sectional view of FIG. 7, taken generally along line 7—7.
Figure 7:
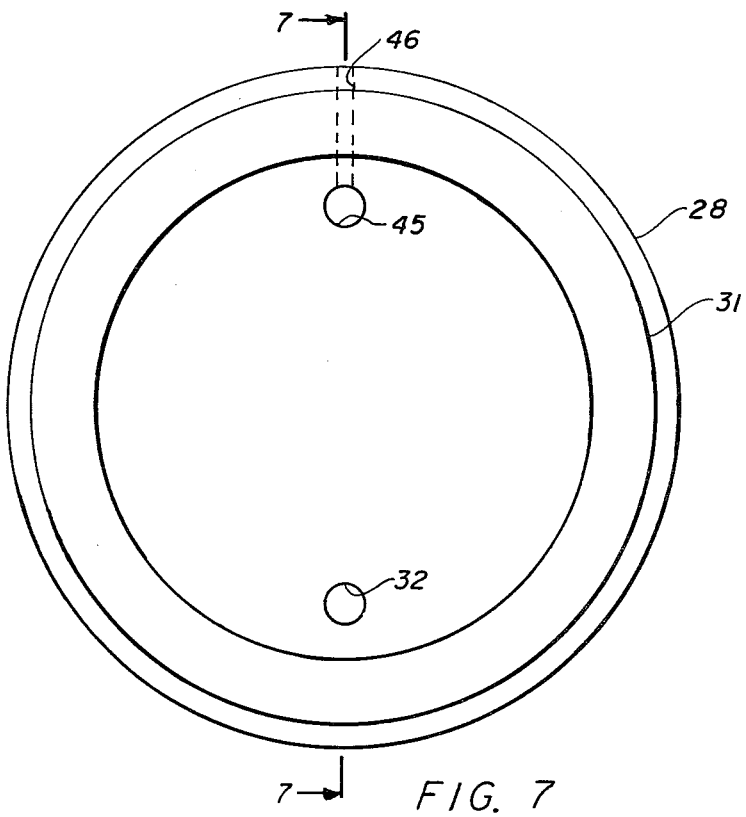
FIG. 7 is a plan view of the molding region of a third embodiment of the molding piston.

FIGS. 7 and 8, depict a further variation of piston member 28 and molding region 34 wherein the overflow means comprises an overflow cell 45 provided with an outlet conduit 46 through which air and water may flow. A filter plug 47 of the aforementioned kind is positioned in the overflow cell 45. Easy removal and replacement of the filter plug 47 is facilitated with an O-ring 48 which maintains the filter plug 47 in the overflow cell 45.

Figure 3:
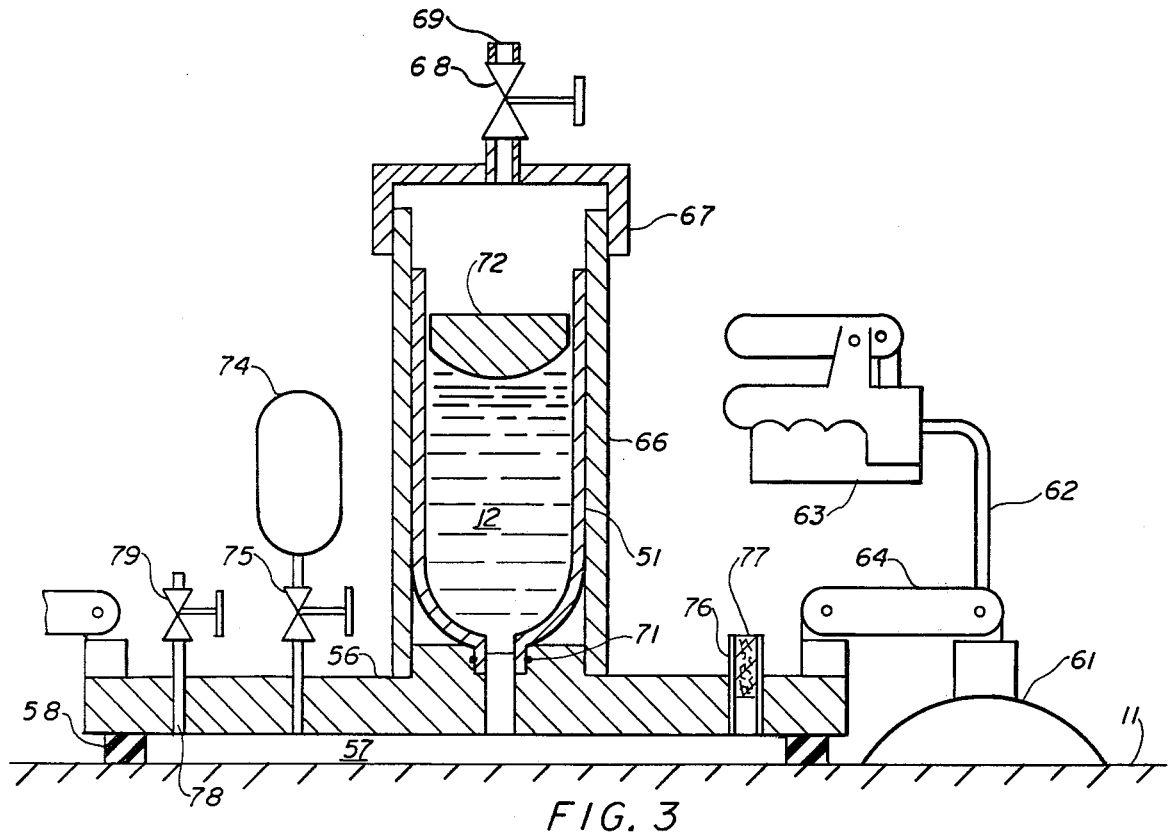
FIG. 3 is a schematic view in section of an alternative, self-contained molding apparatus in operative position on the hull of the ship.

An alternative self-contained type of molding device as shown in FIG. 3 is particularly designed for situations where utilization of pressure lines and surface conduits is precluded. The molding device includes a flat housing 56 which, like the housing 16 and piston member 28 of the molding device 15, may be formed of transparent plastic material to permit observation of the molding process. A housing gasket 58, of similar construction as the gaskets 26, 31 of molding device 15, is attached to the edge portion of the housing 56 to define the periphery of a molding region 57 when the housing 56 is properly secured to the hull surface 11. An additional peripheral seal element 81 as previously disclosed may be positioned around the periphery of the housing gasket 58, in abutting relationship with the housing 56.

Means for securing the housing 56 to the hull surface 11 and for compressing the housing gasket 58 and seal element 81 include a plurality of suction cups 61 attached to the edge portion of the housing 56 with linkages 64, which are arranged to cause the housing 56 to be firmly pressed against the hull surface 11 when the suction cups 61 are firmly engaged with the hull surface 11. A portable hand held vacuum pump 63 having a vacuum line 62 attached thereto as shown in FIG. 3, may be removably secured to the suction cups 61 to create a vacuum between the suction cups 61 and the hull surface 11 to cause the suction cups 61 to be firmly attached thereto. A snap type of connection, for example, may be provided to permit easy removal of the vacuum line 62 and vacuum pump 63 from a suction cup 61. To remove the suction cups 61 from the hull surface 11, a relief valve (not shown) may be connected to each of the suction cups 61.

In operation, the housing 56 is secured to the hull surface 11 so that an outlet conduit 76 is positioned at the lower portion of the molding region 57. The molding region 57 is then prepared for receiving the molding material 12 by removing water from the molding region 57. This is accomplished by opening air valve 75 such that compressed air from air tank 74, which supplies compressed air at a higher pressure than the surrounding water environment, forces water out of the molding region 57 through outlet conduit 76. After the water has been displaced from the molding region 57, the outlet conduit 76, which contains a filter plug 77 of porous polyethylene, is closed-off from the surrounding seawater environment.

Subsequently, a vacuum is applied to the molding region 57 by connecting a vacuum means, such as the hand held vacuum pump 63, to a vacuum conduit 78 and vacuum valve 79. The vacuum conduit 78 is located on the housing 56 in diametrical relationship with outlet conduit 76 so that when the housing 56 is properly positioned on the hull surface 11, the outlet conduit 76 will be located at the bottom of the molding region 57 and the vacuum conduit 78 will be located at the top of the molding region 57.

The molding material 12, contained in a molding cartridge 51, is then injected into the molding region 57. The molding cartridge 51, which is maintained in a secure relationship with the housing 56 by an O-ring 71, is disposed within a fluid tight chamber defined by cylinder 66, cap 67 and valve 68. Thus, when the molding region 57 is substantially evacuated, valve 68 is opened, whereupon the hydrostatic seawater pressure causes the plunger 72 to advance into the disposable molding cartridge. For highly viscous molding materials, a pressure means such as a caulking gun may be attached to port 69. For molding devices having thin molding regions 57, the injection port 32 and the accompanying molding structures 51 and 66 may be located adjacent the outlet conduit 76 to allow the molding region 57 to fill up from the bottom portion of the molding region 57, thereby discouraging the formation of air pockets within the mold material.

Obviously many modifications and variations of the present invention are possible in light of the above teachings. It is therefore to be understood that within the scope of the appended claims, the invention may be practiced otherwise than as specifically described.

What is claimed is:

1. A method of making a mold of a submerged surface comprising the steps of:
   positioning a molding device against the submerged surface;
   securing said molding device to the surface to form a molding region therebetween;
   displacing water with air from said molding region to form an evacuated molding region; and
   introducing a settable material into said evacuated molding region.

2. A method of making a mold of a submerged surface comprises the steps of:
   positioning a molding device against the submerged surface;
   securing the molding device to the submerged surface to form a molding region between the molding device and the submerged surface;
   displacing water from the molding region and evacuating the molding region to form an evacuated molding region; and
   introducing a settable molding material into the evacuated molding region.

3. A molding device for replicating submerged surfaces comprises:
   a housing having means for releasably attaching the housing to an underwater surface;
   a piston member positioned within the housing to move toward and away from the submerged surface, the piston member and the submerged surface cooperate to define a molding region therebetween as the periphery of the piston member is disposed in abutting relationship with the submerged surface;
   flexible means attached to the housing and secured to the piston member for dividing the interior of the housing into forward and rear chambers, the forward chamber communicates with the molding region;
   evacuating means connected to the forward and rear chambers for causing the piston member to move toward and away from the submerged surface, the evacuating means communicates with the molding region defined between the piston member and the submerged surface for evacuating fluid therefrom; and
   means for injecting a settable molding material into the molding region.

4. The molding device according to claim 3, wherein the means dividing the interior of the housing into forward and rear chambers comprises a flexible membrane.

5. The molding device according to claim 3, further comprising means connected to the forward chamber for purging water from the forward chamber.

6. The molding device according to claim 5, wherein the purging means includes a port having a restricted orifice to permit a small amount of air to pass therethrough.

7. The molding device according to claim 3, wherein the releasable attaching means includes a gasket member secured to the housing and encircling the piston member.

8. The molding device according to claim 3, wherein said releasable securing means comprises a collar disposed in abutting relationship with said housing and having a resilient flange depending therefrom, said resilient flange conforming to the submerged surface to form a seal for said housing and permit initial positioning of said housing on the submerged surface.

9. The molding device according to claim 3 further comprising overflow means communicating with the molding region for accomodating excess molding material overflowing from the molding region.

10. The molding device according to claim 2, wherein said overflow means is defined by a gasket element attached to said piston member, said gasket including a gasket portion with openings formed therein for separating said molding region from an overflow region.

11. The molding device according to claim 2, wherein said overflow means comprises a recessed portion in said piston member and passage means communicating with said recessed portion for permitting air and water to flow from said molding region.

12. A molding device for replicating submerged surfaces comprises:
   a housing having means for releasably attaching the housing to a submerged surface;
   a molding section formed in the housing, the molding section and the submerged surface cooperate to define a molding region therebetween as the housing is attached to the submerged surface;
   means for displacing water from the molding region, the displacing means includes a source of pressurized air for bleeding air into the molding region, an outlet port connected to the housing for permitting the flow of displaced water therethrough, and an evacuating means for withdrawing the pressurized air from the molding region while the source of pressurized air and the outlet port are closed off; and
   means for injecting a settable material into the evacuated molding region.

* * * * *